(12) United States Patent
Schrag et al.

(10) Patent No.: US 8,340,920 B2
(45) Date of Patent: Dec. 25, 2012

(54) METHOD AND DEVICE FOR MEASURING FOREIGN BODIES IN THE MEASURING MEDIUM

(75) Inventors: Daniel Schrag, Lufingen (CH); Harald Grothey, Göttingen (DE); Kai Hencken, Lörrach (DE); Jakob Fritsche, Einsiedeln (CH)

(73) Assignee: ABB AG, Mannheim (DE)

( * ) Notice: Subject to any disclaimer, the term of this patent is extended or adjusted under 35 U.S.C. 154(b) by 964 days.

(21) Appl. No.: 12/261,128

(22) Filed: Oct. 30, 2008

(65) Prior Publication Data

US 2009/0120203 A1 May 14, 2009

(30) Foreign Application Priority Data

Oct. 31, 2007 (DE) .......................... 10 2007 052 047

(51) Int. Cl.
*G01N 31/00* (2006.01)
(52) U.S. Cl. ........................................................ 702/28
(58) Field of Classification Search ................... 702/28
See application file for complete search history.

(56) References Cited

U.S. PATENT DOCUMENTS

| | | | |
|---|---|---|---|
| 4,303,980 A | 12/1981 | Yard | |
| 5,339,335 A | 8/1994 | Molnar | |
| 6,804,613 B2 | 10/2004 | Ishikawa et al. | |
| 7,546,212 B2* | 6/2009 | Schrag et al. | 702/45 |
| 7,558,684 B2* | 7/2009 | Patten et al. | 702/45 |
| 2007/0225922 A1* | 9/2007 | Foss et al. | 702/45 |
| 2008/0250867 A1* | 10/2008 | Schmalzried et al. | 73/861.11 |

FOREIGN PATENT DOCUMENTS

| | | |
|---|---|---|
| DE | 101 18 002 A1 | 10/2002 |
| DE | 102 43 748 A1 | 4/2003 |
| GB | 2 057 141 A | 3/1981 |
| WO | WO 01/90702 A2 | 11/2001 |

* cited by examiner

*Primary Examiner* — Aditya Bhat
(74) *Attorney, Agent, or Firm* — Buchanan Ingersoll & Rooney PC

(57) ABSTRACT

The disclosure relates to a method for measuring a flow rate, in particular in an inductive flowmeter, in which an electrical signal is applied to a measuring medium flowing in a measuring tube at electrodes, and the response function at measuring electrodes is determined as a measure of the flow rate, and to a corresponding flowmeter device. So that the flow effects of gas bubbles and/or particles in the measuring medium can be distinguished from other faults and the determination of the flow rate is thus more reliable, the disclosure proposes that, in order to detect gas bubbles and/or particles in the measuring medium, a magnetic and/or electric field is applied to the latter and the potential and/or current is/are read out at one or more electrodes, the signal profile A(t), together with its signal-to-noise component, is measured electronically as a function of the time, and a statistical evaluation is used to infer the existence of gas bubbles and/or particles.

33 Claims, 4 Drawing Sheets

METHOD AND DEVICE FOR MEASURING FOREIGN BODIES IN THE MEASURING MEDIUM

RELATED APPLICATION

This application claims priority under 35 U.S.C. §119 to German Patent Application No. 10 2007 052 047.8 filed in Germany on Oct. 31, 2007, the entire content of which is hereby incorporated by reference in its entirety.

TECHNICAL FIELD

The disclosure relates to a method and a device for measuring foreign bodies in the measuring medium, in particular in an inductive flowmeter and one having electrodes which are in contact with the measuring medium.

BACKGROUND INFORMATION

Flowmeters which are operated in a magnetically inductive manner are known. In this case, a magnetic field is induced via a defined measuring tube, and a signal generated by the magnetic field is measured using at least one pair of electrodes having a junction with the fluid.

Methods and devices of this type have recently been used with diagnostic means for detecting the state of the device, on the one hand, and for detecting disruptions in the flow of the measuring medium, on the other hand. To this end, the actual measurement signal which determines the flow rate is used only secondarily. It is primarily the arrangement of electrodes, which are in contact with the measuring medium, that is used to electrically obtain significant measured values. When signals are fed in via the electrodes, limit values which reliably prevent electrolysis processes from being initiated at the electrodes in the measuring medium are technically set with respect to voltage and current.

However, in addition to the functional disruptions of the device itself, otherwise uniform flows of the measuring media may also enter disrupted states, for example on account of cavitation in which turbulent flows past tube contours produce such negative pressures that gas bubbles, which then also have to pass through the flowmeter device, are suddenly nevertheless produced in a fluid medium which is otherwise free of gas bubbles. Furthermore, other materials such as solids, contaminants or the like in the measuring medium may cause disruptions such that, in a manner similar to gas bubbles, although a sum flow rate is measured, it does not exclusively correspond to the flow rate of the actually desired measuring medium. It proves to be particularly difficult to detect this state, in particular.

In addition, flowmeters are subject to ageing processes which have a drifting influence on the flow rates determined. In other words, the susceptibility to faults increases.

In this case, it is now particularly important to be able to preclude sources which give rise to conventional faults. These are the gas bubbles and particles in the measuring medium which have already been described above.

Therefore, in order to detect aging effects, effects produced by gas bubbles and particles must be clearly identified as such first of all.

DE 102 43 748 and DE 101 18 002 disclose electromagnetic flowmeters in which impedances between one or more electrodes and an earthing point are measured. However, gas bubbles in the flow, for example, are not detected in a significant manner in this case.

SUMMARY

A method and a device of the generic type are disclosed to the effect that the flow effects of gas bubbles and/or particles in the measuring medium can be distinguished from other faults and the determination of the flow rate is therefore more reliable.

A method for measuring foreign bodies in the measuring medium is disclosed, in particular in an inductive flowmeter and one having electrodes which are in contact with the measuring medium, wherein in order to detect gas bubbles and/or particles in the measuring medium, a magnetic and/or electric field is applied to the latter and the potential and/or current is/are read out at one or more electrodes, the signal profile A(t), together with its signal-to-noise component, is measured electronically as a function of the time, and a statistical evaluation is used to infer the existence of gas bubbles and/or particles.

A flowmeter device is disclosed, in particular in an inductive flowmeter device and one having electrodes which are in contact with the measuring medium, wherein in order to detect gas bubbles and/or particles in the measuring medium, the amplitude signal profile A(t), together with its signal-to-noise profile, is measured electronically as a function of the time at least one electrode and can be read into and evaluated in electronic evaluation means for mathematical post-processing, with statistical evaluation being able to be used to infer the existence of gas bubbles and/or particles, and said profiles can be quantified by means of an adaptive data field comparison with historical data and can be displayed/read out in a display or read-out device.

BRIEF DESCRIPTION OF THE DRAWING

The disclosure is illustrated in the drawing and is explained in more detail below. In the drawing.

DETAILED DESCRIPTION

Figure 1:
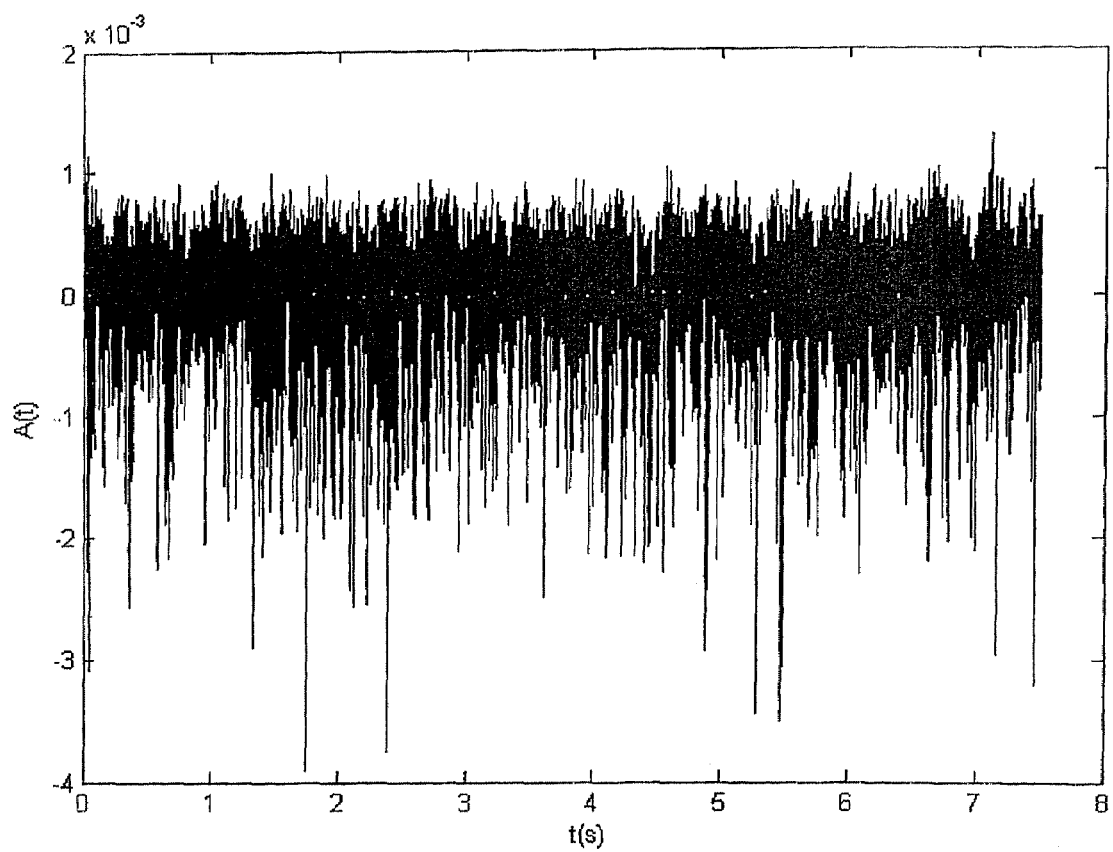
FIG. 1: shows an exemplary signal representation A(t)

In order to detect gas bubbles and/or particles in the measuring medium, a magnetic and/or electric field is applied to the latter and the potential and/or current is/are read out at one or more electrodes, the signal profile A(t), together with its signal-to-noise component, is measured electronically as a function of the time, and a statistical evaluation is used to infer the existence of gas bubbles and/or particles.

In this case, voltages and/or currents are measured inside the sensor unit, by means of signalling, by applying one or more voltages and/or currents to one or more electrodes or by introducing an electric field, for example by means of a magnetic field. The voltages and/or currents are measured at one or more electrodes. The temporal fluctuation in the measured values can be used to infer foreign matter or gas bubbles in the fluid. These are particles or bubbles having properties and electrical conductivities which are different from those of the fluid itself.

Irrespective of its implementation in an electromagnetic flowmeter, the measuring method described and mentioned above can also be used in other electrode systems in which there is a flow.

Gas bubbles can be detected in a clear and reproducible manner as a result of the special feature of the measurement.

In this case, the measurement signal is designed in such a manner that the signal from the air bubbles is modulated onto the carrier signal which, in this case, is the E field which has been fed in or the field induced by a B field. It is "amplitude modulation".

Expressed in formulae, this means that the signal fed in at one electrode, for example, is defined by $$U\text{in}=U0*\cos(wt)$$

The field/signal detected at the second electrode is given by $$U\text{out}=A(t)*\cos(wt+\text{phi})$$

In this case, the amplitude is $$A(t)=U0*k[1+a(t)]$$

In this case, k is a fixed factor which depends on the geometry of the flowmeter. Phi is a possible phase shift between the two electrode signals.

However, this phase shift is small in the present case. The influence of the air bubbles a(t) is thus a multiplicative factor with regard to the signal which has been fed in.

If the signal which has been fed in is a constant DC voltage (w=0), the following results $$U\text{out}\sim=(1+a(t))*k*U0=a(t)*k*U0+U0*k$$

In contrast, (external) noise, for example caused by the measuring electronics, would be additive, that is to say, formally $$U\text{out}=U0*k*\cos(wt+\text{phi})+\text{delta}U(t))$$

In an exemplary embodiment, a positive standard deviation and a negative standard deviation are produced in the signal-to-noise profile A(t) with regard to its amplitude-related central position, and the existence of gas bubbles and/or particles in the measuring medium is inferred when asymmetry occurs. In this case, this significance is decisive for the effect used according to the disclosure.

In an exemplary embodiment, a number of statistical parameters can be used for this novel method. For example, the statistical parameters of the average value and/or standard deviation and/or skewness and/or variance and/or autocorrelation and/or the asymmetry of the signal are used for evaluation.

The input signal is advantageously fed into the measuring medium at a frequency of at least 100 Hz, the time dependence of the signal which has been fed in being able to be separated from the amplitude signal.

The noise is advantageously evaluated in a variable manner in the frequency range of 1 to 1000 Hz. The effect is clearest and most reliable in this frequency window under said excitation conditions.

In another exemplary embodiment, the signal strength is automatically varied in a cyclical manner and the criterion of a proportional concomitant growth of the noise can be first of all used to qualitatively infer the existence of gas bubbles and/or particles, and a quantitative evaluation is carried out thereafter.

In this case, use is made of the knowledge that normal noise is independent of the signal strength or amplitude, whereas the noise caused by gas bubbles concomitantly grows in proportion with the amplitude. For this reason, a change in the amplitude is thus produced and is then automatically evaluated, if appropriate, in order to determine whether the noise is concomitantly growing in a proportional manner or is constant, that is to say remains independent of the amplitude.

This additional measure thus makes it possible to verify the metrological assumption that gas bubbles may be present.

In another exemplary embodiment, historical data are adaptively recorded. In this case, a correlation is established between the respectively recorded signal values and the values for the presence of gas bubbles and/or particles, which have been respectively determined and, if appropriate, quantified and are then evaluated and quantified, and is also stored with correlating combination of the data. Such storage of historical data is advantageously started adaptively in this case in such a manner that technical "empirical values" for the detection of gas bubbles are continuously updated in a storage device. The determination of gas bubbles is continuously optimized in this manner.

In another exemplary embodiment, the flow rate plus the quantity of gas and/or the quantity of particles is displayed.

With corresponding calibration and continuous adaptation, the qualitative evaluation of the asymmetry can even be used to determine the described quantity of gas and/or quantity of particles concomitantly carried in gas bubbles in the measuring medium.

In another exemplary embodiment, the colour is changed on the display of the flowmeter device when it is determined that gas bubbles are present in order to correspondingly indicate that the instantaneous measured value of the flow rate is encumbered with gas bubbles.

In an exemplary embodiment, the field is effected by means of a feeding-in operation at a first electrode and signal removal at another electrode, and the measuring tube is earthed, and the signal is generated and measured with respect to earth potential.

However, as an alternative to this, the feeding-in operation and signal removal may also be carried out at the same electrode(s).

With regard to a flowmeter device, the essence of the disclosure is that, in order to detect gas bubbles and/or particles in the measuring medium, the amplitude signal profile A(t), together with its signal-to-noise profile, is measured electronically as a function of the time at least one electrode and can be read into and evaluated in electronic evaluation means for mathematical post-processing, with statistical evaluation being able to be used to infer the existence of gas bubbles and/or particles, and said profiles can be quantified by means of an adaptive data field comparison with historical data and can be displayed/read out in a display or read-out device.

In an exemplary embodiment of the device, the display device is a display which is able to change colour and automatically changes the display background colour, on the basis of the determination of gas bubbles and/or particles in the measuring medium, in comparison with the display state without gas bubbles/particles. The operating personnel can thus detect immediately, that is to say even from a relatively great distance, that the instantaneous flow is encumbered with gas bubbles.

In another exemplary embodiment, the electronic means for determining gas bubbles and/or particles are combined to form a separate device or a device which can be separated, which device can also be subsequently connected/fitted to the measuring arrangement of an inductive or capacitive flowmeter device or other flowmeter devices in modular fashion.

FIG. 1 shows the time signal of the amplitude A(t) with a proportion of air bubbles of approximately 1%. In this case, an asymmetric distribution of said amplitude around the zero position can already be seen. This can be attributed to the existence of gas bubbles in the flowing medium. In this case, a 1 kHz AC signal voltage has already been demodulated, that is to say only the amplitude is shown. This representation shows an excerpt of 400 milliseconds.

Figure 2:
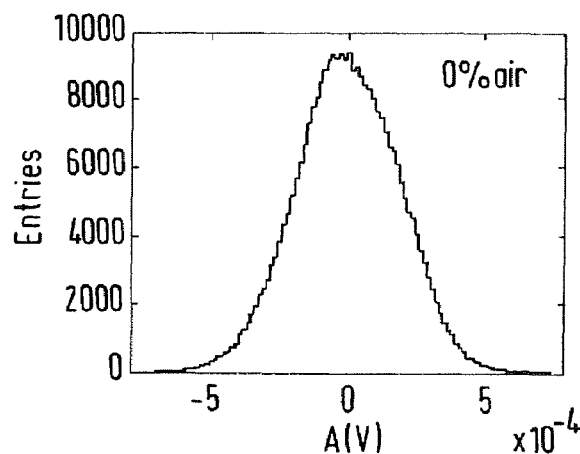
FIG. 2: shows an exemplary distribution function of the amplitudes around a zero position.
Figure 2:
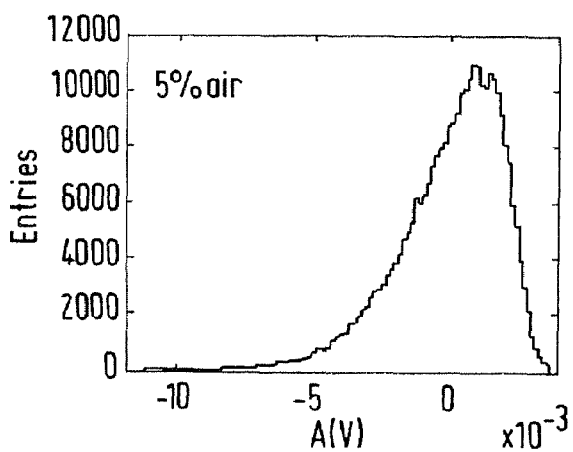
Figure 2:
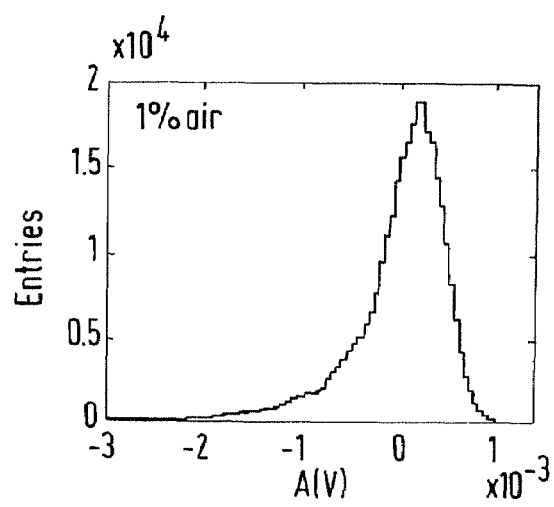

FIG. 2 shows the actual effect in an even clearer manner in a plurality of individual images. The top curve is a statistical representation of the distribution of the amplitude maxima around a centred zero position. It can be seen in this case that the distribution is symmetrical, which was determined with a proportion of gas bubbles of 0%. The second curve, that is to say the middle curve, shows the distribution of the amplitude maxima with a proportion of gas bubbles of 1%, in which case it is already possible to see clear asymmetry in the distribution around the zero position.

The distribution with a proportion of gas bubbles of 5% is illustrated in the lower representation and is thus still significant. It can be seen that the extent of asymmetry makes it possible to directly infer the proportion of gas bubbles.

Figure 3:
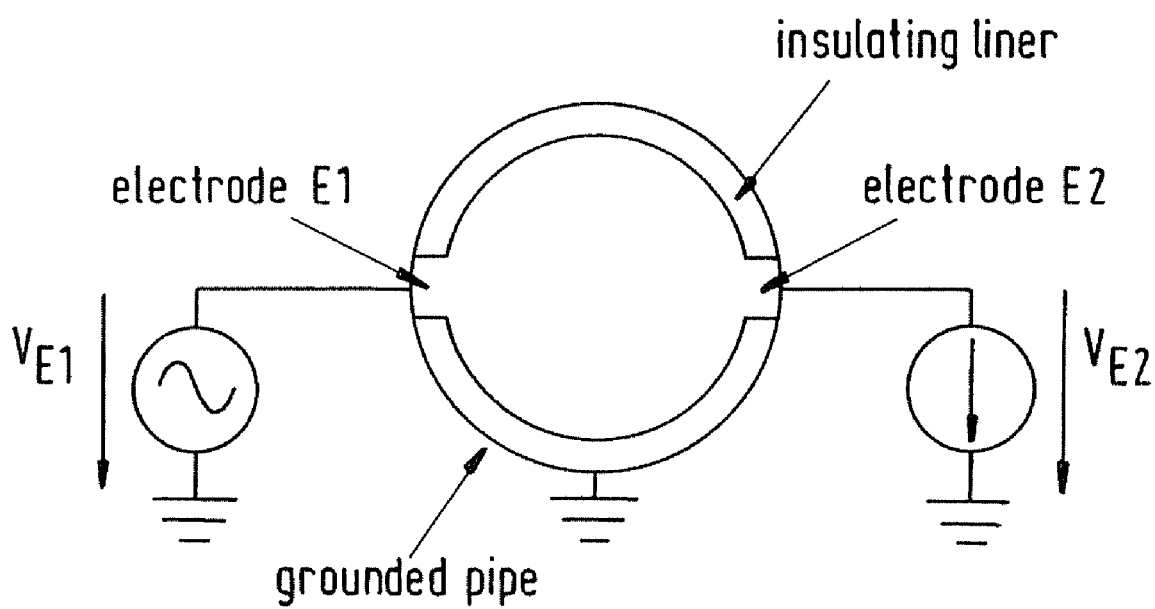
FIG. 3: shows an exemplary fundamental configuration.

FIG. 3 shows a basic metrological design for this purpose, in which an electrical signal (current or voltage) is applied to one electrode. The signal is measured at the further electrode. The medium between the two electrodes changes as a result of foreign bodies which do not have the same physical properties as the medium. Signal processing (demodulation, filtering, Fourier analysis) in the time domain and/or frequency domain and calculation of the statistical parameters (average value, standard deviation, skewness, variance, autocorrelation, asymmetry of the signal) make it possible to infer foreign bodies, as shown in FIGS. 1 and 2.

In this illustration, different electrodes are used for feeding in and removing signals.

Figure 4:
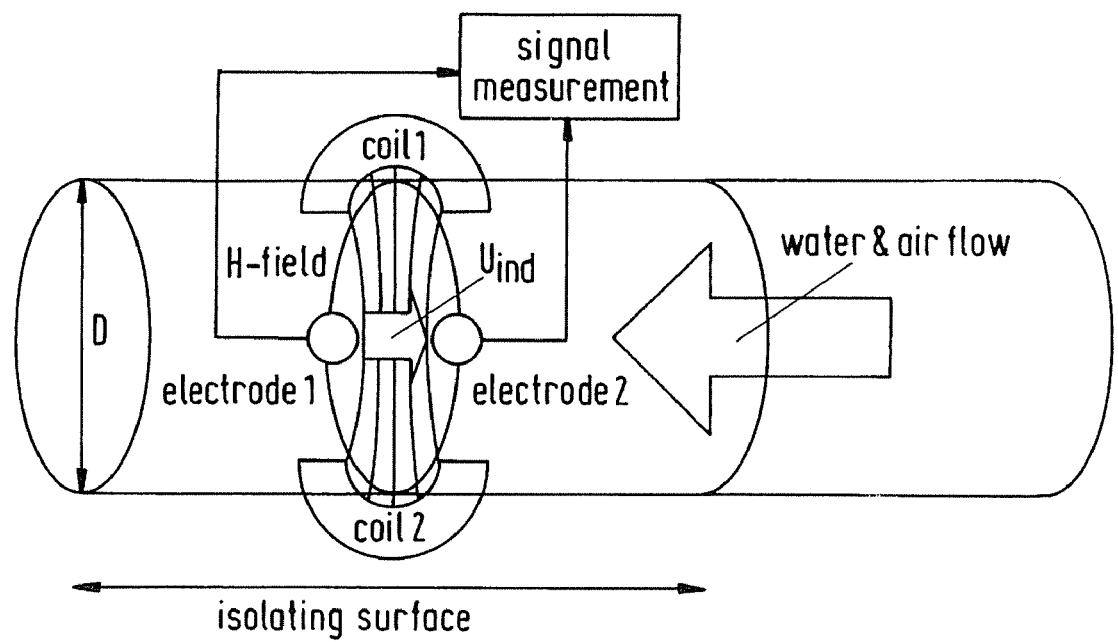
FIG. 4: shows an exemplary configuration with magnetic induction.

FIG. 4 shows the design with an applied magnetic field in the sense of a magnetically inductive flowmeter. Two electrodes are used there. In this case, a magnetic field is applied to the magnetically inductive flowmeter. In this case, an electric field is produced in the moving fluid on account of the Lorentz force. The signal evaluation is analogous to the first exemplary embodiment. It may also be carried out in parallel with the flow rate measurement.

In order to detect a change in the medium, the measuring device can be set differently. For the purpose of detection, factory calibration or customer calibration can first of all be carried out with the measuring fluid and possibly also with the known foreign body contamination. Secondly, a long-term average value which makes it possible to detect a change in the medium as a result of foreign bodies may also be determined as an alternative.

Measurement using different signals which have been fed in may also make it possible to detect air bubbles.
The statistical analysis finally makes it possible to state the probability of foreign bodies.

In order to sensitize the device with respect to particular particles, for example, or the distinction between particles and gas bubbles, the adaptive evaluation of instantaneous data can be carried out in comparison with stored patterns of established verified measurement results.

The measuring device for measuring gas bubbles and/or particles in measuring media, e.g., fluid measuring media, can also be used in all flowmeter devices and also, independent of flowmeter devices, wherever there are flows in pipelines. In such an embodiment, this additional universal use is best possible if the device for measuring gas bubbles and particles is a separate device or a device which can be separated per se.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for measuring foreign bodies in a measuring medium or an inductive flowmeter having electrodes which are in contact with the measuring medium, comprising:
    applying a magnetic and/or electric field is applied to the measuring medium;
    reading a potential and/or current at one or more electrodes;
    measuring a signal profile A(t) of the potential and/or current read at the one or more electrodes, together with its signal-to-noise component, electronically as a function of time; and
    determining an existence of gas bubbles and/or particles using a statistical evaluation of the signal profile A(t).

2. The method according to claim 1, wherein statistical parameters of an average value and/or standard deviation and/or skewness and/or variance and/or autocorrelation and/or asymmetry of the signal are used for evaluation.

3. The method according to claim 2, wherein the field is applied by means of a current or voltage signal at one or more electrodes, and the signal A(t) is measured at one or more electrodes.

4. The method according to claim 1, wherein the field is applied by means of a current or voltage signal at one or more electrodes, and the signal A(t) is measured at one or more electrodes.

5. The method according to claim 4, wherein the field is effected by means of a feeding-in operation at a first electrode and signal removal at another electrode, and the measuring tube is earthed, and the signal is generated and measured with respect to earth potential.

6. The method according to claim 1, comprising:
    feeding-in the field at a first electrode and removing a signal removal at another electrode; and
    earthing the measuring tube; and
    generating and measuring the signal with respect to earth potential.

7. The method according to claim 6, wherein the feeding-in operation and signal removal are carried out at the same electrode(s), for example by applying an AC voltage when measuring the electrode current.

8. The method according to claim 1, wherein a feeding-in operation and signal removal are carried out at a first electrode(s), for example by applying an AC voltage when measuring electrode current.

9. The method according to claim 1, wherein as the signal, a magnetic field is applied, for example via a coil which is present in magnetically inductive flowmeters, and a current and/or voltage signal is measured at one or more electrodes.

10. The method according to claim 9, wherein the input signal is fed into the measuring medium at a high frequency of at least 100 Hz, the frequency being selected in such a manner that a time dependence of the signal which has been fed in can be separated from an amplitude signal.

11. The method according to claim 1, wherein the input signal is fed into the measuring medium at a high frequency of at least 100 Hz, the frequency being selected in such a manner that a time dependence of the signal which has been fed in can be separated from an amplitude signal.

12. The method according to claim 11, wherein the noise is evaluated in a frequency range of 1 to 1000 Hz, the frequency range being able to be firmly selected or adapted to the flow rate.

13. The method according to claim 1, wherein the noise component is evaluated in a frequency range of 1 to 1000 Hz, the frequency range being able to be firmly selected or adapted to a flow rate.

14. The method according to claim 13, wherein the signal strength is automatically varied and a criterion of a proportional concomitant growth of the noise component is used to qualitatively infer the existence of gas bubbles and/or particles, and a quantitative evaluation is carried out thereafter.

15. The method according to claim 1, wherein signal strength is automatically varied and a criterion of a proportional concomitant growth of the noise component is used to qualitatively infer the existence of gas bubbles and/or particles, and a quantitative evaluation is carried out thereafter.

16. The method according to claim 15, wherein an amplitude signal is evaluated by means of signal processing by integrating signal power in a frequency range which is characteristic of foreign bodies and comparing it with history or unaffected frequency ranges or by means of filtering and averaging and/or by means of statistical methods in order to use said signal to infer foreign bodies.

17. The method according to claim 1, wherein an amplitude signal is evaluated by means of signal processing by integrating signal power in a frequency range which is characteristic of foreign bodies and comparing it with history or unaffected frequency ranges or by means of filtering and averaging and/or by means of statistical methods in order to use said signal to infer foreign bodies.

18. The method according to claim 17, wherein the signal-to-noise profile A(t) is used to calculate a positive weighting and a negative weighting with regard to its amplitude-related central position, and the existence of gas bubbles and/or particles in the measuring medium is inferred when asymmetry occurs.

19. The method according to claim 1, wherein the signal profile A(t) is used to calculate a positive weighting and a negative weighting with regard to its amplitude-related central position, and the existence of gas bubbles and/or particles in the measuring medium is inferred when asymmetry occurs.

20. The method according to claim 19, wherein historical data are adaptively recorded and a current measured value is compared with these data.

21. The method according to claim 1, wherein historical data are adaptively recorded and the current measured value is compared with these data.

22. The method according to claim 21, wherein a flow rate and/or a quantity of gas and/or a quantity of particles is/are displayed.

23. The method according to claim 1, wherein a flow rate and/or a quantity of gas and/or a quantity of particles is/are displayed.

24. The method according to claim 23, wherein a fluid flow rate is corrected based on an amount of foreign matter.

25. The method according to claim 1, wherein a fluid flow rate is corrected based on an amount of foreign matter.

26. The method according to claim 25, wherein a diagnostic signal is displayed when a selectable threshold of the noise signal component and/or amount of foreign matter/gas is exceeded.

27. The method according to claim 1, wherein a diagnostic signal is displayed when a selectable threshold of the noise signal component and/or amount of foreign matter/gas is exceeded.

28. A flowmeter device, comprising:
a measuring medium;
electrodes which are in contact with the measuring medium;
electronic evaluation means for measuring an amplitude signal profile A(t) and its signal-to-noise profile electronically as a function of time at at least one electrode, and performing a statistical evaluation to determine an existence of gas bubbles and/or particles, wherein said profiles are quantified by means of an adaptive data field comparison with historical data; and
a display or read-out device for displaying said profiles.

29. The flowmeter device according to claim 28, wherein the display or read-out device is a display which is able to change colour and automatically changes a display background colour, based on the determination of gas bubbles and/or particles in the measuring medium, in comparison with a display state without gas bubbles/particles.

30. The flowmeter device according to claim 28, wherein when the existence of gas bubbles and/or particles in the measuring medium is determined, a flashing operation or a display status can be generated on the display.

31. A measuring device for detecting gas bubbles and/or particles in a flowable measuring medium, in particular in conjunction with a flowmeter device according to claim 30, wherein the electronic evaluation means for determining gas bubbles and/or particles are combined to form a separate device or a device which can be separated, which device can also be subsequently connected/fitted to a measuring arrangement of any desired flowmeter device in modular fashion.

32. A measuring device for detecting gas bubbles and/or particles in a flowable measuring medium, in particular in conjunction with a flowmeter device according to claim 28, wherein the electronic evaluation means for determining gas bubbles and/or particles are combined to form a separate device or a device which can be separated, which device can also be subsequently connected/fitted to the measuring arrangement of any desired flowmeter device in modular fashion.

33. The flowmeter device according to claim 28, wherein the flowmeter is an inductive flowmeter device.

* * * * *